(12) United States Patent
Tamir et al.

(10) Patent No.: US 10,157,055 B2
(45) Date of Patent: Dec. 18, 2018

(54) CODE REFACTORING MECHANISM FOR ASYNCHRONOUS CODE OPTIMIZATION USING TOPOLOGICAL SORTING

(71) Applicant: Microsoft Technology Licensing, LLC, Redmond, WA (US)

(72) Inventors: Gal Tamir, Avichayil (IL); Elad Iwanir, Tel Aviv (IL); Eli Koreh, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/280,754

(22) Filed: Sep. 29, 2016

(65) Prior Publication Data

US 2018/0088937 A1 Mar. 29, 2018

(51) Int. Cl.
*G06F 9/45* (2006.01)
*G06F 8/72* (2018.01)
*G06F 8/41* (2018.01)

(52) U.S. Cl.
CPC ............. *G06F 8/72* (2013.01); *G06F 8/433* (2013.01); *G06F 8/4441* (2013.01)

(58) Field of Classification Search
CPC ........................................................ G06F 8/72
USPC ........................................................ 717/154
See application file for complete search history.

(56) References Cited

U.S. PATENT DOCUMENTS

| 6,550,059 | B1 * | 4/2003 | Choe ....................... G06F 8/447 717/149 |
| 7,370,318 | B1 | 5/2008 | Howe et al. |
| 7,631,304 | B2 | 12/2009 | Bearman et al. |
| 8,234,637 | B2 | 7/2012 | Ghosh-Roy et al. |
| 8,881,074 | B2 * | 11/2014 | Faes ..................... G06F 17/5045 716/101 |
| 8,984,259 | B2 | 3/2015 | Hulse et al. |
| 9,038,033 | B1 * | 5/2015 | Hidayat .................. G06F 8/433 717/126 |
| 2011/0258594 | A1 | 10/2011 | Syme et al. |

OTHER PUBLICATIONS

"Source Code Analysis Tools", Published on: Jul. 1, 2014 Available at: https://www.owasp.org/index.php/Source_Code_Analysis_Tools.

(Continued)

*Primary Examiner* — Wei Y Zhen
*Assistant Examiner* — Lanny N Ung
(74) *Attorney, Agent, or Firm* — Fiala & Weaver P.L.L.C.

(57) ABSTRACT

Methods, systems, apparatuses, and computer program products are provided for transforming asynchronous code into more efficient, logically equivalent asynchronous code; Program code is converted into a first syntax tree. A dependency graph is generated from the first syntax tree with each node of the dependency graph corresponding to a code statement and having an assigned weight. Weighted topological sorting of the dependency graph is performed to generate a sorted dependency graph. A second syntax tree is generated from the sorted dependency graph. In another implementation, the program code is transformed into await-relaxed and/or loop-relaxed program code prior to being transformed into the first syntax tree.

20 Claims, 7 Drawing Sheets

(56) References Cited

OTHER PUBLICATIONS

Dig, Danny, "Refactoring for Asynchronous Execution on Mobile Devices", In Journal of IEEE Software, vol. 32, Issue 6, Nov. 2015, pp. 52-61.
Maruyama, Katsuhisa, "Automated Method-Extraction Refactoring by Using Block-Based Slicing" In Proceedings of the symposium on Software reusability: putting software reuse in context, May 18, 2001, pp. 31-40.
Brown, Gordon, "Performance Optimization in Visual Basic .NET", Published on: Sep. 2002 Available at: https://msdn.microsoft.com/en-us/library/aa289513(v=vs.71).aspx.
Ge, et al., "Manual Refactoring Changes with Automated Refactoring Validation", In Proceedings of 36th International Conference on Software Engineering, May 31, 2004, 11 pages.

* cited by examiner

CODE REFACTORING MECHANISM FOR ASYNCHRONOUS CODE OPTIMIZATION USING TOPOLOGICAL SORTING

BACKGROUND

Various types of software development applications exist that software developers may use to develop software. An integrated development environment (IDE) is a type of software development application that contains several development tools in one package. An IDE may include tools such as a source code editor ("code editor"), a build automation tool, and a debugger. Examples of IDEs include Eclipse™ developed by Eclipse Foundation of Ottawa, Canada, ActiveState Komodo™ developed by ActiveState of Vancouver, Canada, IntelliJ IDEA developed by JetBrains of the Czech Republic, Oracle JDeveloper™ developed by Oracle Corporation of Redwood City, Calif., NetBeans developed by Oracle Corporation, Codenvy™ developed by Codenvy of San Francisco, Calif., Xcode® developed by Apple Corporation of Cupertino, Calif., and Microsoft® Visual Studio®, developed by Microsoft Corporation of Redmond, Wash.

Many development tools and programming languages enable program code to be generated that includes synchronous and asynchronous operations. Synchronous processes/operations have to complete before the rest of the program code can continue execution. Asynchronous processes/operations do not have to complete before the rest of the program code can continue execution. In particular, if a program statement performs an operation that has to be waited on for completion before program execution can continue, that program statement is considered to be performed synchronously. If a program statement performs an operation that does not have to be waited on for completion before program execution can continue, that program statement is considered to be performed asynchronously. As such, asynchronous operations enable more efficient execution of program code.

A programming language may include keywords that designate operations for asynchronous operation. For instance, in the C# programming language, the "async" keyword is used to designate an asynchronous method that generates a task as a result, and program execution can continue until the "await" keyword is encountered. The "await" keyword is used to retrieve the result of the task when the asynchronous method is eventually complete, and once the result is returned, program execution may continue. Other programming languages such as Scala, Python, Go, and JavaScript, may use the keywords "async" and "await" in a similar fashion as C#, and/or may use other keywords in any suitable fashion to designate asynchronous code and to indicate tasks to be awaited on.

In asynchronous programming, the position in the program code for the "await" (or similar) keyword in the program code can have a significant impact on how efficiently the program code executes, including altering the running time of the code drastically.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for transforming asynchronous code into more efficient, logically equivalent asynchronous code; Program code is converted into a first syntax tree. A dependency graph is generated from the first syntax tree with each node of the dependency graph corresponding to a code statement and having an assigned weight. Weighted topological sorting of the dependency graph is performed to generate a sorted dependency graph. A second syntax tree is generated from the sorted dependency graph. Refactored code is optionally generated from the second syntax tree.

In one implementation, the program code is transformed into await-relaxed program code prior to being converted to the first syntax tree, such as by converting awaits on method calls to awaits on tasks. If the program code includes one or more loops containing awaits, the program code may be loop-relaxed such as by extracting the await(s) from the loop(s).

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
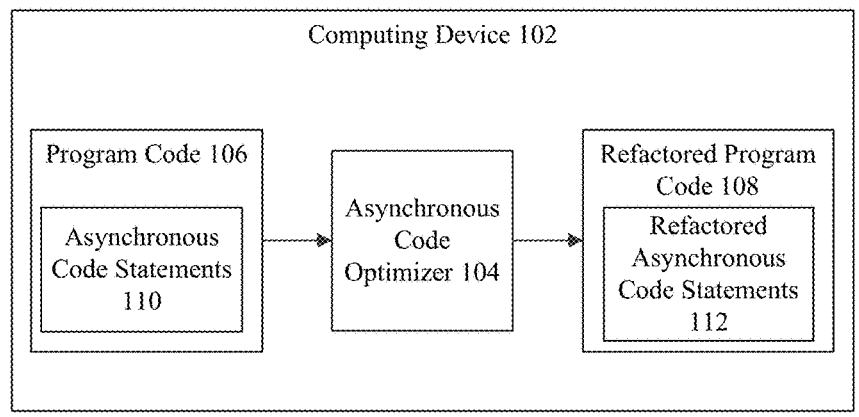
FIG. 1 shows a block diagram of a computing device that contains an asynchronous code optimizer configured to improve an efficiency of asynchronous program code execution, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Optimizing Queries in Program Code

Many development tools and programming languages enable synchronous and asynchronous programming. A program must wait for a synchronous process/operation to complete before continuing execution. A program does not have to wait for an asynchronous process/operation to complete before continuing execution. As such, asynchronous operations can enable more efficient execution of program code.

A programming language may include keywords that designate operations for asynchronous operation. For instance, in the C# programming language, the "async" keyword is used to designate an asynchronous method that generates a task as a result, and program execution can continue until the "await" keyword is encountered. The "await" keyword is used to retrieve the result of the task when the asynchronous method is eventually complete, and once the result is returned, program execution may continue. Programming languages like Scala, Python, JavaScript, and others may use the keywords "async" and "await" in similar or different ways to C#, and/or may use other keywords in any suitable fashion to designate asynchronous code and to indicate tasks to be awaited on.

As such, in asynchronous programming, the position in the program code for the "await" (or similar) keyword can have a significant impact on how efficiently the program code executes, including altering the running time of the code drastically. The less experienced the developer (also known as "programmer" or "computer programmer"), the more likely that developer will develop program code that inefficiently handles asynchronous operations.

According to embodiments, an automated tool is provided that analyzes the developer's code and refactors it without changing the underlying programming logic. This analysis and refactoring can increase the performance of asynchronous operations in the program code, which can relieve performance bottlenecks in many applications.

In an embodiment, the tool performs several steps, including (a), building the relevant data structures, (b) analyzing the code for potential locations for improving asynchronous performance, and (c) refactoring the code. For instance, in (a), each awaited, asynchronous statement may be divided into two logically equal statements, where the first is a statement that returns a "task" (in C# terminology) and the second statement is the actual wait on that task. In addition, "await" statements in loop scope code, if any exist, may be observed as a component. Each code statement is decomposed, and a dependency graph is built (e.g., a directed acyclic graph). In (b), each code statement is ranked/weighted. For instance, ranking values from 0 to 2 may be used, where 0 is assigned to code statements that begin an asynchronous command, 1 is assigned to non-asynchronous code statements, and 2 is assigned to awaited code statements. The dependency graph may be topologically sorted, and the weighted-topologically sorted graph can be used find the best place to position the await statements without changing the code logic. The refactoring of code in (c) is optional. If the developer chooses to, the tool may perform the actual code refactoring according to the analysis.

Various techniques may be used for the topological sorting of the dependency graph, including topological sorting with modified-DFS (Depth first search), recursion (which can result in higher memory consumption), or known scheduling algorithms.

Accordingly, embodiments provide a tool that moves "await" or similar statements in program code in a way that improves the code's efficiency, that finds an efficient ordering by running topological sorting, and that can notify the developer about potential code improvements, while performing the actual refactoring at the developer's option.

Embodiments may be implemented in various ways. For instance, FIG. 1 shows a block diagram of a computing device 102 that contains an asynchronous code optimizer 104 configured to improve an efficiency of asynchronous program code execution, according to an example embodiment. As shown in FIG. 1, asynchronous code optimizer 104 receives program code 106 entered by a developer (a person who writes/inputs/modifies program code). Program code 106 includes one or more asynchronous code statements 110. Asynchronous code statements 110 include methods and other code statements that utilize asynchronous programming, such as through the inclusion of "async" and "await" keywords, or through other keywords or flags for code statements that may execute asynchronously. Asynchronous code optimizer 104 is configured to analyze and generate a replacement set of code statements for asynchronous code statements 110, thereby outputting refactored program code 108 that includes refactored asynchronous code statements 112. Refactored program code 108 is program code that is logically equivalent (performs the same function(s)) to original program code 106, but is rewritten with refactored asynchronous code statements 112. Refactored asynchronous code statements 112 are configured to perform more efficiently than original asynchronous code statements 110, such as by including await statements repositioned to execute in as delayed a manner as possible, and extracting await statements from loops to reduce a number of awaits that are performed.

Figure 2:
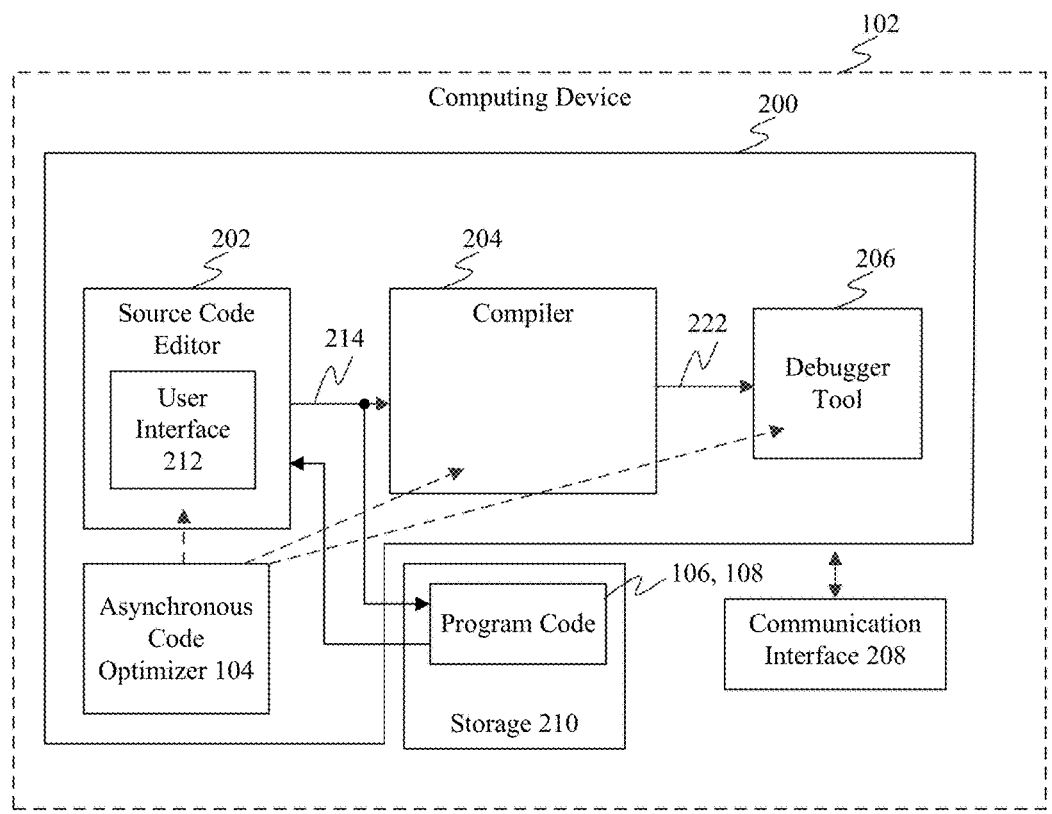
FIG. 2 shows a block diagram of a computing device that includes a development application having an asynchronous code optimizer configured to improve an efficiency of asynchronous program code execution, according to an example embodiment.

Asynchronous code optimizer 104 may be implemented independently or included in any system or tool that may be used by a developer to input or process program code, such as a code editor, a code compiler, a code debugger, etc. For instance, FIG. 2 shows a block diagram of computing device 102 including a development application 200 that includes asynchronous code optimizer 104, according to an example embodiment. Development application 200 is an example of an integrated development environment (IDE). As shown in FIG. 2, computing device 102 including development application 200, storage 210, and a communication interface 208. Storage 210 stores program code 106 and 108. Development application 200 includes a source code editor 202, a compiler 204, and a debugger tool 206. Source code editor 202 includes a user interface 212. As indicated by dotted arrows, asynchronous code optimizer 104 may be implemented in or called by any one or more of source code editor 202, complier 204, and/or debugger tool 206. Note that development application 200 is shown for illustrative purposes, and as an example embodiment, and not all features of development application 200 need to be present in all embodiments. Furthermore, additional features not shown in FIG. 2 may be present in some embodiments. The features of development application 200 shown in FIG. 2 are described as follows.

As shown in FIG. 2, development application 200 may be implemented in one or more computing devices 102. For instance, source code editor 202, compiler 204, and debugger tool 206 may be included in a same computing device, or one or more of source code editor 202, compiler 204, and debugger tool 206 may be implemented in one or more computing devices separate from those of others of source code editor 202, compiler 204, and debugger tool 206.

Computing device 102 may be one or more of any type of stationary or mobile computing device(s), including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer).

Code editor 202 may be any proprietary or conventional code editor configured for editing of program code mentioned elsewhere herein or otherwise known (e.g., a code editor of Eclipse™, ActiveState Komodo™, IntelliJ IDEA, Oracle JDeveloper™ NetBeans, Codenvy™, Xcode®, Microsoft® Visual Studio®, etc.).

A developer may interact with source code editor 202 to enter and modify program code when generating source code for an application. For instance, the developer may interact with a user interface 212 of source code editor 202 to add, modify, or delete program code text such as by typing, by voice input, by selecting suggested code blocks, etc. Accordingly, user interface 212 may include one or more text entry boxes/windows (e.g., code editor window 604 of FIG. 6), voice/speech recognition, one or more graphical user interface elements (e.g., buttons, check boxes, radio buttons, pull down menus, etc.), and/or other user interface elements that a developer may interact with. When complete, or at other intervals, the user may be enabled to save the program code by interacting with a "save" button or other user interface element.

For instance, as shown in FIG. 2, a developer may interact with user interface 212 of source code editor 202 to generate program code 106. Program code 106 is source code, which is a collection of computer instructions (possibly with comments) written using a human-readable computer programming language. Examples of suitable human-readable computer programming languages include C#, C++, Java, etc. Program code 106 may be received in one or more files or other form. For instance, program code 106 may be received as one or more ".c" files (when the C programming language is used), as one or more ".cpp" files (when the C++ programming language is used), etc. When asynchronous code optimizer 104 is used by source code editor 202 to process program code 106 for improvements in asynchronous code execution, refactored program code 108 may be generated and saved by source code editor 202.

As shown in FIG. 2, program code 106 and/or 108 may be stored in storage 210. Storage 210 may include one or more of any type of physical storage hardware/circuitry to store data, including a magnetic disc (e.g., in a hard disk drive), an optical disc (e.g., in an optical disk drive), a magnetic tape (e.g., in a tape drive), a memory device such as a RAM device, a ROM device, etc., and/or any other suitable type of physical storage hardware/circuitry.

Compiler 204 may be invoked in any manner, such as by a command line, a graphical user interface, etc. A "-full" switch, or other switch, may be used when compiler 204 is invoked to perform a full compile. Compiler 204 is configured to receive and compile program code 106 (or program code 108) to generate machine code 222. In particular, compiler 204 is configured to transform program code 106 and/or 108 into machine code 222 in the form of another computer language, typically having a binary form, referred to as machine code or object code. In some cases, compiler 204 may include multiple stages, and may first convert program code 106 into an intermediate form (e.g., an intermediate language), which is subsequently converted into machine code 222.

Compiler 204 may be configured to perform one or more types of optimizations on program code 106 and/or 108 when generating machine code 222. An optimized build results in machine code that is semantically equivalent to machine code generated without optimizations, but is configured in a way that fewer resources are used during execution of the optimized machine code (e.g., less memory, fewer procedure calls, etc.). Examples of optimizations that may be performed include loop optimizations, data-flow optimizations, SSA-based optimizations, code-generator optimizations, functional language optimizations, interprocedural optimizations, and/or further types of optimizations that would be known to persons skilled in the relevant art(s). Many specific types of optimizations exist. For example, "inlining" may be performed, where a callee function called by a caller function is copied into the body of the caller function. In another example of a specific optimization, "common subexpression elimination" may be performed, where a single instance of code is used for a quantity that is computed multiple times in source code. When asynchronous code optimizer 104 is used by compiler 204 to process program code 106 for improvements in asynchronous code execution, refactored program code 108 may be generated and used to generate machine code 222 by compiler 204.

Machine code 222 may be included in a file (e.g., an object or ".obj" file), or may be created/stored in another form, to form an executable program or application. Machine code 222 may optionally be stored in storage 210.

When program code 106 and/or 108 is compiled by compiler 204 for the debug stage of development, debugger tool 206 may receive machine code 222. Debugger tool 206 is configured to run a debugger (or "debug", "debugging") session on the application represented by machine code 222. In a debugger session, a developer may be enabled to step through the execution of code of machine code 222, while viewing the values of variables, arrays, attributes, and/or outputs (e.g., contents of registers, a GUI, etc.) generated by the execution of machine code 222, including having access to the effects of any debug code/statements entered into program code 106 and/or 108 (and passed to machine code 222 by compiler 204 for purposes of debug). In this manner, a developer may be able to test or troubleshoot ("debug") program code 106 and/or 108, making edits to program code 106 and/or 108 using source code editor 202 based on the results of the debugger session. The modified version of program code 106 and/or 108 may be compiled by compiler 204 and received by debugger tool 206 for further debugging. During debug, debugger tool 206 may enable asynchronous code optimizer 104 to suggest asynchronous program code improvements in program code 106 to generate program code 108. Debugger tool 206 may include one or more processors (e.g., a central processing unit (CPU)), physical and/or virtual, that execute(s) machine code 222.

When debugging by debugger tool 206 is complete, and program code 106 and/or 108 is in its final version, compiler 204 may compile program code 106 and/or 108 to generate machine code 222 for the release stage of development. The release version of machine code 222 may be released to be used by users.

Communication interface 208 is configured to transmit program code 106 and/or 108 to remote entities, and/or to communicate other data according to any suitable communication protocol, proprietary or conventional. Further examples of communication interfaces and communication protocols are described in the next section.

Figure 3:
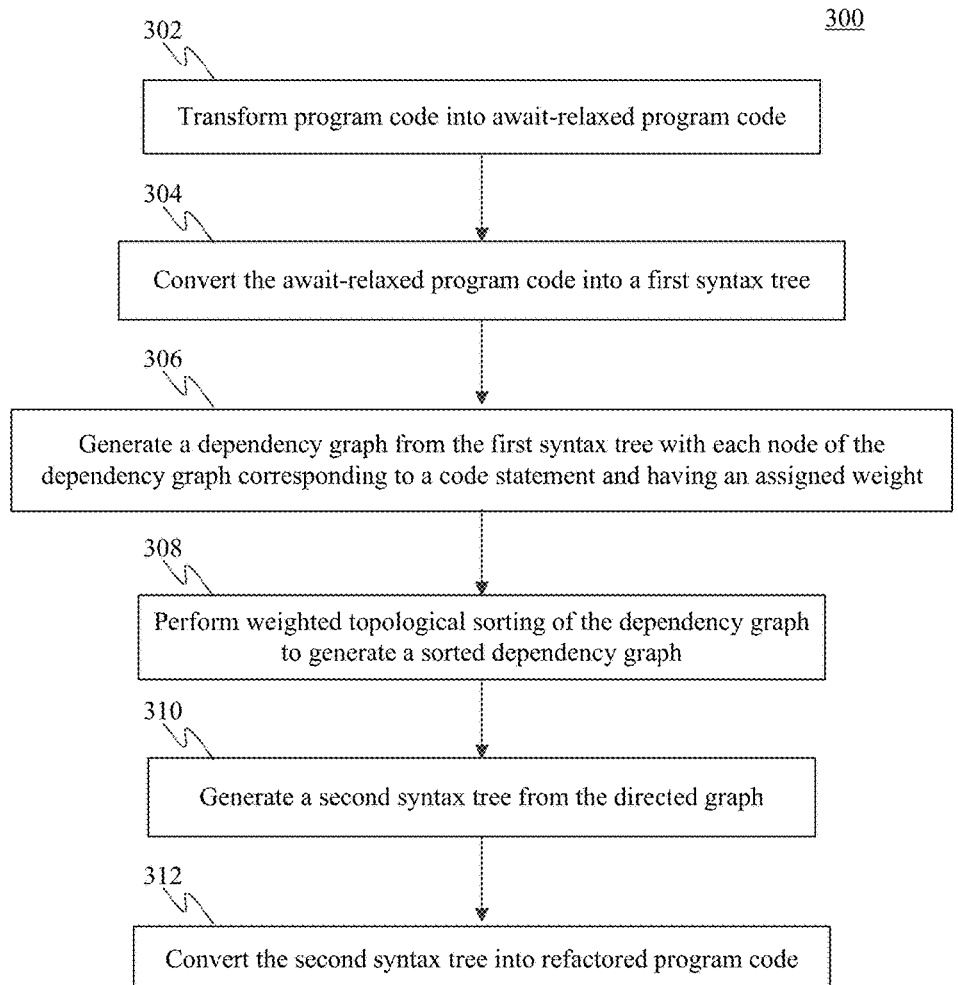
FIG. 3 shows a flowchart providing a process for improving an efficiency of asynchronous code execution, according to an example embodiment.
Figure 4:
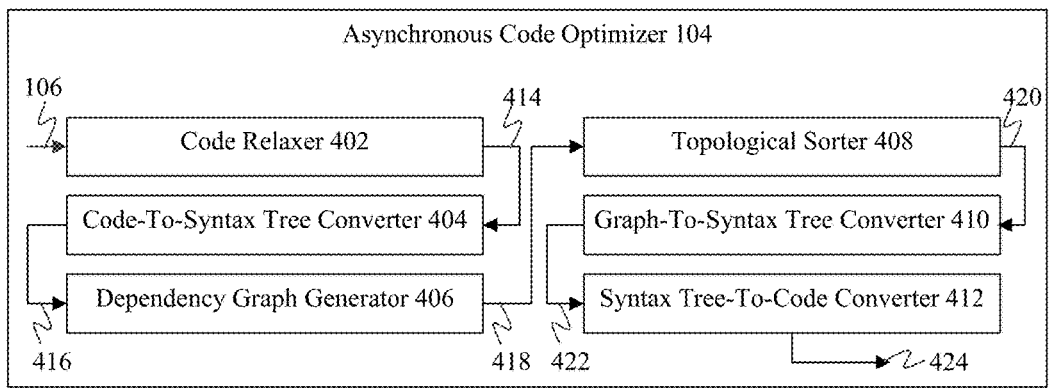
FIG. 4 shows a block diagram of an asynchronous code optimizer, according to an example embodiment.

Asynchronous code optimizer 104 may be configured in various ways to perform its functions. For instance, FIG. 3 shows a flowchart 300 providing a process for improving an efficiency of asynchronous code execution, according to an example embodiment. Asynchronous code optimizer 104 may operate according to flowchart 300 in an embodiment. Flowchart 300 is described as follows with reference to FIG. 1 and FIG. 4. FIG. 4 shows a block diagram of asynchronous code optimizer 104, according to an example embodiment. As shown in FIG. 4, asynchronous code optimizer 104 includes a code relaxer 402, a code-to-syntax tree converter 404, a dependency graph generator 406, a topological sorter 408, a graph-to-syntax tree converter 410, and a syntax tree-to-code converter 412, which are described as follows with reference to flowchart 300.

Flowchart 300 begins with step 302. In step 302, program code is transformed into await-relaxed program code. As shown in FIG. 1, asynchronous code optimizer 104 receives program code 106, which includes asynchronous code statements 110. Code relaxer 402 of FIG. 4 is configured to parse through program code 106 to detect asynchronous code statements. Code relaxer 402 may detect asynchronous code statements in any manner, such as by searching program code 106 for indications of asynchronous code, such as by finding asynchronous code keywords. For instance, when parsing C# code, code relaxer 402 may parse through program code 106 for known C# asynchronous code keywords such as "async," "task," and "await."

In a first illustrative example, code relaxer 402 may parse the following C# program code for asynchronous code statements:

```
public class MyProgram
{
    public async SendAllEmails( )
    {
        var emailSender = new EmailSender( );
        var recipients = new List<EmailAddress>( )
        {
            new EmailAddress("User1@microsoft.com"),
            new EmailAddress("User2@microsoft.com")|
        };
        var emailContent1 = new MailContent("first mail :)");
        await emailSender.SendEmail(recipients, emailContent1);
        var emailContent2 = new MailContent("second mail :)");
        await emailSender.SendEmail(recipients, emailContent2);
```

This example program code sends two emails (containing the messages "first mail:)" and "second mail:)") to the email addresses included in the variable "recipients" (User1@microsoft.com and User2@microsoft.com). In this example, code relaxer 402 may detect the C# keywords of "async" and "await," and may flag the corresponding methods/code statements as being asynchronous code statements, which are repeated below for ease of illustration:

```
public async Task SendAllEmails( )
await emailSender.SendEmail(recipients, emailContent1);
await emailSender.SendEmail(recipients, emailContent2);
```

For other programming languages, code relaxer 402 may identify asynchronous code statements using the same or other keywords and/or other identifiers.

In this example, the "SendEmail" methods send the emails sequentially, the first SendEmail method having to complete (due to the "await" statement) before the second SendEmail is performed. Thus, if the duration of an email sending is 5 seconds, the total duration of the above program code will be around 10 seconds for the 2 emails.

Figure 5:
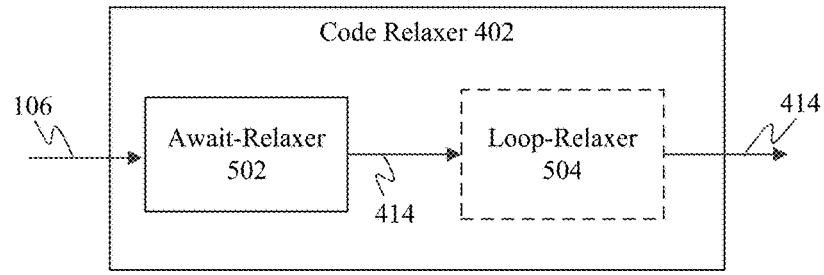
FIG. 5 shows a block diagram of a code relaxer, according to an example embodiment.
Figure 6:
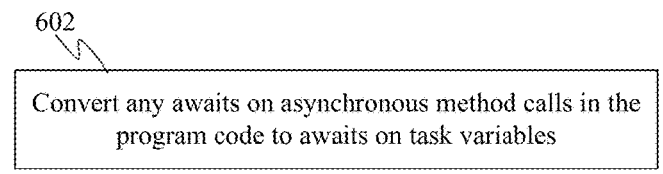
FIG. 6 shows a process for await-relaxing program code, according to an example embodiment.

According to step 302, code relaxer 402 is configured to transform program code into await-relaxed program code. Code relaxer 402 may perform this function in various ways. For instance, FIG. 5 shows a block diagram of code relaxer 402, according to an example embodiment. As shown in FIG. 5, code relaxer 402 may include an await-relaxer 502 and a loop-relaxer 504. Await-relaxer 502 may be configured to perform step 302 to transform program code into await-relaxed program code. For example, await-relaxer 502 may operate according to FIG. 6. FIG. 6 shows a step 602 for await-relaxing program code, according to an example embodiment. Await-relaxer 502 and step 602 are described as follows.

In step 602, any awaits on asynchronous method calls in the program code is/are converted to awaits on task variables. In an embodiment, await-relaxer 502 is configured to convert awaits detected in program code 106 on asynchronous method calls to awaits on task variables (or similar attributes of program code in other programming languages). In this manner, the awaits can be repositioned in the program code to occur later, and thereby defer any awaiting in the program code until later.

In an embodiment, await-relaxer 502 performs step 602 by converting await method calls to awaits on task variables according to the following conversion operation:

await f(x)------>Task<T>y=f(x); await y;

In other words, for a function f(x) preceded by an await keyword ("await f(x)"), await-relaxer 502 generates a "task<T>y" statement, by generating a task (e.g., using a var keyword) that assigns the function(x) to the task variable "y", and the task variable y is awaited upon rather than the function.

For example, the first await on the SendEmail method shown above is repeated below:

await emailSender. SendEmail(recipients, emailContent1);

This await on a method may be converted by await-relaxer 502 to:

var mail1=emailSender.SendEmail(recipients, emailContent1);
await mail1;

where
function f(x) is emailSender.SendEmail(recipients, emailContent1);
task variable y is mail1, and
task<T> is established by the C# keyword var.

The second await on the SendEmail method shown above may similarly be converted to:

var mail2=emailSender.SendEmail(recipients, emailContent2);
await mail2;

In this manner, with reference to FIG. 5, code relaxer 402 uses await-relaxer 502 to "await relax" program code 106 to generate await-relaxed program code 414. Await-relaxed program code 414 includes the converted forms of awaits on methods to the await-relaxed form.

Figure 7:
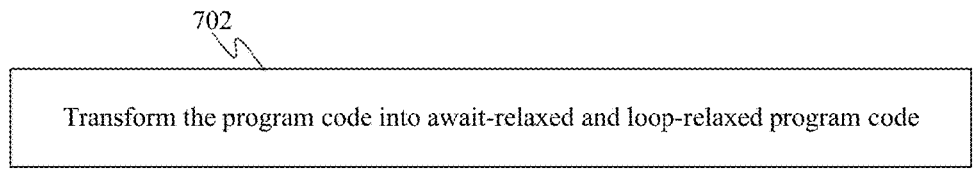
FIG. 7 shows a process for relaxing code, according to an example embodiment.

In an embodiment, code relaxer 402 may use loop-relaxer 504 to loop-relax program code 414. Note that such loop-relaxing may be performed by loop-relaxer 504 during step 302 of flowchart 300, or may instead be performed later (e.g., during step 306 when a dependency graph is generated). In embodiments where loop-relaxing is performed, code relaxer 402 may operate according to FIG. 7, which shows a step 702 for relaxing code. In step 702, program code is transformed into await-relaxed and loop-relaxed program code. For instance, await-relaxer 502 may be present to perform the await-relaxing of program code 106 to generate await-relaxed program code 414, and loop-relaxer 504 may be present to perform loop-relaxing of await-relaxed program code 414 to generate await-relaxed program code 414 as await- and loop-relaxed program code. Note that in another embodiment, loop-relaxer 504 may loop-relax program code 106 prior to await-relaxer 502 await-relaxing program code 106.

Loop relaxer 504 performs loop relaxing of program code to avoid having program code loops that include await statements, which result in multiple sequential awaits to be performed, slowing down program code execution.

In a second illustrative example of code relaxing, where loop relaxing is performed, code relaxer 402 may parse the following C# program code for asynchronous code statements:

```
public class EmailSender
{
    private IEmailClient m_client;
    public async Task SendEmail(
        IEnumerable<EmailAddress> recipients, MailContent content)
    {
        foreach (var recipient in recipients)
        {
            await m_client.SendEmail(recipient, content);
        }
    }
}
```

This program code is an example of the SendEmail method present in the first example program code further above. This second example of program code obtains a collection of recipients and sends email (containing "content") to each of them. As shown in this second example, because the developer included the await keyword inside the foreach statement, which identifies a loop, the program code sends the email to each recipient, one at a time, waiting for each email sending to complete before moving onto the next email in the next loop iteration, which can be very time consuming. For instance, if the duration of an email sending is 2 seconds, the total duration of the above program code will be the number of recipients multiplied by 2 seconds.

Figure 8:
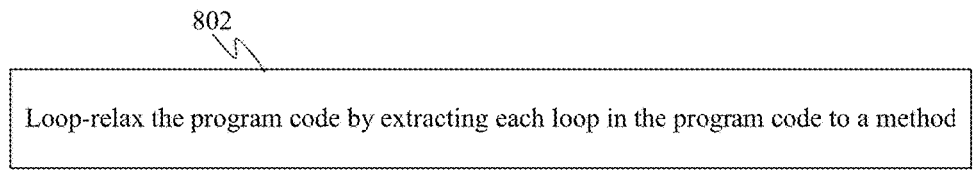
FIG. 8 shows a process for loop-relaxing program code, according to an example embodiment.

According to step 702, code relaxer 402 is configured to transform program code into await-relaxed and loop-relaxed program code, with the loop-relaxing performed by loop-relaxer 504. Loop-relaxer 504 may loop-relax program code in various ways, including by operating according to FIG. 8. FIG. 8 shows a step 802 for loop-relaxing program code, according to an example embodiment. Loop-relaxer 504 and step 702 are described as follows.

In step 802, the program code is loop-relaxed by extracting each loop in the program code to a method. In an embodiment, loop-relaxer 504 is configured to loop-relax awaits detected to be included in loops by extracting the loops to methods. In this manner, an await is not conducted during each loop of the loop code.

In particular, to extract a loop to a method, loop-relaxer 504 is configured to analyze dependencies between iterations of the loop to determine whether they are independent. A list/collection of tasks is inserted into the program code prior to the start of the loop, each task in the loop is added to this collection, and after the loop statement completes all loop iterations, an await is performed on all of the collected tasks, such as by a Task.WhenAll keyword (C#) or similar keyword/function.

For example, the foreach loop code portion of the second example program code shown above is repeated below:

```
foreach (var recipient in recipients)
{
    await m_client.SendEmail(recipient, content);
}
```

In this example, await-relaxer 502 may first await-relax the await code statement by transforming the await statement to an await on a task variable:

```
foreach (var recipient in recipients)
{
    Task task = m_client.SendEmail(recipient, content);
    await task;
}
```

Then, loop-relaxer 504 extracts the await from the loop as follow

```
var tasks = new List<Task>( );
foreach (var recipient in recipients)
{
    tasks.Add(m_client.SendEmail(recipient, content));
}
await Task.WhenAll(tasks);
```

In particular, loop-relaxer 504 extracts the await from the loop by creating a task collection "tasks" outside the loop, by modifying the task code statement inside the loop with the "Add" keyword so that the tasks occurring within the loop are added to the collection, and by pulling the await on task ("await task;") outside the loop, and converting the await with the "Task.WhenAll" keyword to an await on all of the tasks of the collection, only completing when all tasks have completed. All of the tasks can be initiated inside the loop without awaiting on each one individually, instead awaiting on the entire collection of tasks outside the loop.

In this manner, with reference to FIG. 5, code relaxer 402 uses await-relaxer 502 and loop-relaxer 504 to "await and loop relax" program code 106 to generate await-and-loop-relaxed program code 508. Await-and-loop-relaxed program code 508 includes the forms of await methods converted to the await-relaxed form and the forms of loops containing awaits converted to the loop-relaxed form.

Note that step 302 of flowchart 300 is optional. In some embodiments, neither await-relaxing nor loop-relaxing of program code are performed, and instead, step 302 is skipped (or is not present) and step 304 of flowchart 300 is performed on program code that is not await-relaxed (and not loop-relaxed). In such an embodiment, code relaxer 402 of FIG. 4 may not be present (or may not be active) in asynchronous code optimizer 104, and code-to-syntax tree converter 404 receives and operates on program code 106.

Referring back to flowchart 300 of FIG. 3, in step 304, the await-relaxed program code is converted into a first syntax tree. In an embodiment, code-to-syntax tree converter 404 of FIG. 4 is configured to receive await-relaxed program code 414 (which may also be loop-relaxed), and to convert the received program code to a first syntax tree 416. A syntax tree (sometimes referred to as an "abstract syntax tree") is a tree representation of the abstract syntactic structure of source program code. The syntax tree includes nodes, with each node of the syntax tree representing a construct in the program code, such as a code statement, condition, variable, etc. The nodes are connected into a tree by branches which indicate the interrelationships between the nodes. The syntax tree is "abstract" in not representing every detail of the actual syntax of the program code, such as grouping parentheses, etc. A syntax tree may be generated by syntax analysis of the program code, which determines the constructs of the program code, assigns the constructs to nodes, and saves the relationships between the constructs as edges.

Such syntax tree generation may be performed in a parser of a compiler (e.g., compiler 204 of FIG. 2) or elsewhere. Syntax trees and further techniques for generating syntax trees are well known to persons skilled in the relevant art(s).

First syntax tree 416 generated by code-to-syntax tree converter 404 indicates all of the nodes and interrelationships determined for await-relaxed program code 414.

In step 306 of flowchart 300, a dependency graph is generated from the first syntax tree with each node of the dependency graph corresponding to a code statement and having an assigned weight. In embodiment, dependency graph generator 406 receives first syntax tree 416, and is configured to generate a dependency graph 418 based on first syntax tree 416. In an embodiment, dependency graph 418 is a directed graph of the components of the syntax tree, meaning that dependency graph 418 has nodes and edges, with each node corresponding to a code statement, and each edge directed from one node to another node. Dependency graph generator 406 assigns weights to the nodes of the dependency graph. In an embodiment, dependency graph 418 may be "acyclic," such that there is no way to start at a node and loop back to that node again.

Figure 9:
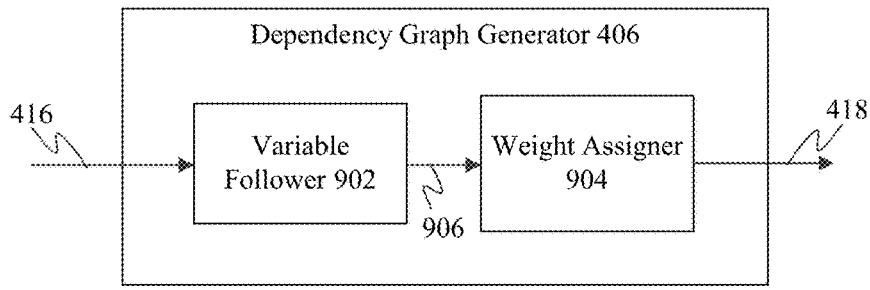
FIG. 9 shows a block diagram of a dependency graph generator, according to an example embodiment.
Figure 10:
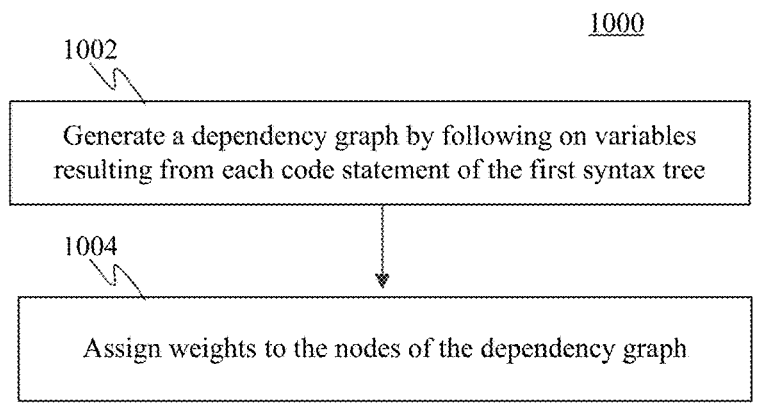
FIG. 10 shows a flowchart providing a process for generating a dependency graph, according to an example embodiment.

Dependency graph generator 406 may be configured to generate dependency graph 418 in various ways. For instance, FIG. 9 shows a block diagram of dependency graph generator 406, according to an example embodiment. As shown in FIG. 9, dependency graph generator 406 may include a variable follower 902 and a weight assigner 904. Dependency generator 406 may operate according to FIG. 10. FIG. 10 shows a flowchart 1000 providing a process for generating a dependency graph, according to an example embodiment. Dependency generator 406 and flowchart 1000 are described as follows.

In step 1002, a dependency graph is generated by following on variables resulting from each code statement of the first syntax tree. In an embodiment, variable follower 902 is configured to generate an unweighted dependency graph 906 based on first syntax tree 416 by setting each code statement as a node, and following on variables resulting from each code statement (node) of first syntax tree 416. The direction of followed variable from node-to-node provides the direction of the edge between those nodes. Unweighted dependency graph 906 indicates the nodes for each code statement, the edges between nodes, and the directions of the edges.

In step 1004, weights are assigned to the nodes of the dependency graph. In an embodiment, weight assigner 904 receives unweighted dependency graph 906 and assigns a weight to each node of unweighted dependency graph 906 to generate dependency graph 418 (weighted). The weights may have any suitable values, depending on the particular implementation, and may be assigned based on various factors, including the type of operation (e.g., asynchronous or synchronous) performed by the node.

Figure 11:
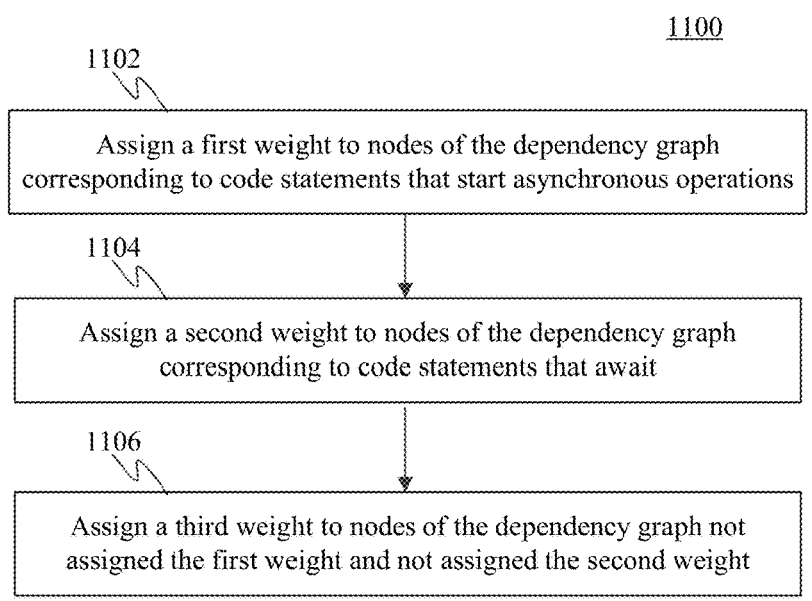
FIG. 11 shows a flowchart providing a process for assigning weights to nodes of a dependency graph, according to an example embodiment.

For instance, weight assigner 904 may operate according to FIG. 11. FIG. 11 shows a flowchart 1100 providing a process for assigning weights to nodes of a dependency graph, according to an example embodiment.

In step 1102, a first weight is assigned to nodes of the dependency graph corresponding to code statements that start asynchronous operations. In an embodiment, weight assigner 904 parses unweighted dependency graph 906 to determine any code statements that begin asynchronous operations. For example, weight assigner 904 may parse unweighted dependency graph 906 for code statements where task variables are assigned to begin an asynchronous operation (which ends in the code with an "await" keyword).

With respect to the first example program code described above, after await-relaxing, the following two code statements assign task variables:

```
var mail1 = emailSender.SendEmail(recipients, emailContent1);
var mail2 = emailSender.SendEmail(recipients, emailContent2);
```

Thus, in this first example program code, these two code statements may each be assigned the "first" weight value by weight assigner 904. In an embodiment, weight assigner 904 may assign a weight of "0" to code statements that start an asynchronous operation, though in other embodiments, any other weight value may be assigned for such an operation.

In step 1104, a second weight is assigned to nodes of the dependency graph corresponding to code statements that await. In an embodiment, weight assigner 904 parses unweighted dependency graph 906 to determine any code statements that correspond to code statements that await. For example, weight assigner 904 may parse unweighted dependency graph 906 for code statements where an "await" keyword (e.g., in C#, etc.) or analogous keyword is used. With respect to the first example program code described above, after await-relaxing, the following two code statements await (e.g., contain the "await" keyword):

await mail1;
await mail2;

Thus, in this first example program code, these two code statements may each be assigned the "second" weight value by weight assigner 904. In an embodiment, weight assigner 904 may assign a weight of "2" to code statements that await, though in other embodiments, any other weight value may be assigned for such an operation.

In step 1106, a third weight is assigned to nodes of the dependency graph not assigned the first weight and not assigned the second weight. In an embodiment, weight assigner 904 parses unweighted dependency graph 906 to determine any code statements that do not start an asynchronous operation and do not await. For example, weight assigner 904 may parse unweighted dependency graph 906 for code statements where no task variables are assigned and no "await" keywords are used, or weight assigner 904 may merely assign the third weight to any code statements that were not assigned the first or second weights after steps 1102 and 1104. With respect to the first example program code described above, after await-relaxing, the following code statements were not assigned the first or second weights:

```
public class MyProgram
{
    public async Task SendAllEmails( )
    {
        var emailSender = new EmailSender( );
        var recipients = new List<EmailAddress>( )
        {
            new EmailAddress("User1@microsoft.com"),
            new EmailAddress("User2@microsoft.com")
        };
        var emailContent1 = new MailContent("first mail :)");
        var emailContent2 = new MailContent("second mail :)");
```

Thus, in this first example program code, these code statements may each be assigned the "third" weight value by weight assigner 904. In an embodiment, weight assigner 904 may assign a weight of "1" to code statements that neither start asynchronous operations nor await, though in other embodiments, any other weight value may be assigned for such an operation.

In the example of assigning weight values 0-2, the lowest value weight is given to code statements that start asynchronous operations, the highest value weight is given to code statements that await, and the middle value weight is given to code statements that are neither. In this manner, code statements that start asynchronous operations may be prioritized to appear earlier in code, while code statements that await may be positioned later in code.

As described above, dependency graph generator 406 generates dependency graph 418 to indicate nodes corresponding to code statements of first syntax tree 416, directed edges between the nodes that indicate directions of variable flows between nodes, and weights for the nodes.

Note that in the embodiment of FIG. 3, steps 304 and 306 combine to transform code to a dependency graph. In another embodiment, program code may be transformed directly to a dependency graph without the intermediate conversion to a syntax tree.

Referring back to FIG. 3, in step 308 of flowchart 300, weighted topological sorting of the dependency graph is performed to generate a sorted dependency graph. In embodiment, topological sorter 408 receives dependency graph 418, and is configured to generate a sorted dependency graph 420 based thereon. In an embodiment, sorted dependency graph 420 is version of dependency graph 418 that is topologically sorted based on the weights applied to the nodes of dependency graph 418.

A topological sort or topological ordering performed by topological sorter 408 of a directed graph, such as dependency graph 418, is a linear ordering of its nodes such that for every directed edge uv from node u to node v, u comes before v in the ordering. For instance, the nodes of dependency graph 418 represent code statements to be performed, and the edges represent constraints such that one code statement must be performed before another, providing a valid sequence for the tasks. Any suitable topological sorting algorithm, proprietary or known to persons skilled in the relevant art(s), may be implemented by topological sorter 408. The topological sorting may be implemented using Kahn's algorithm (choosing vertices in the same order as the eventual topological sort), modified-DFS (Depth first search) (looping through each node of dependency graph 418, in an arbitrary order, initiating a depth-first search that terminates when it hits any node that has already been visited since the beginning of the topological sort or the node has no outgoing edges (i.e. a leaf node)), shortest path through a weighted directed acyclic graph, recursion, known scheduling algorithms, and/or any other suitable technique.

In an embodiment, topological sorter 408 takes the weights applied to the nodes of dependency graph 418 during the sorting, ordering lower valued weights earlier and higher value weights later where possible. For instance, with respect to the above example of assigning weight values 0-2, code statements that start asynchronous operations (0 weight) are prioritized to occur earliest, code statements that await (2 weight) are ordered to occur latest where possible, and code statements that are neither of these (1 weight) are neutral. In this manner, the code statements that start asynchronous operations are executed early to give maximal time to complete, and the code statements that await are executed as late as possible to reduce as much as possible the time spent awaiting.

As described above, topological sorter 408 generates sorted dependency graph 420 to indicate a re-ordering (sorting) of the nodes (relative to dependency graph 418) corresponding to code statements of first syntax tree 416, and directed edges between the nodes that indicate directions of variable flows between nodes. Sorted dependency graph 420 represents a sequence of operations (code statements) that naturally can be converted back into a program code (by passing through syntax tree, as in step 310 of flowchart 300).

Referring back to FIG. 3, in step 310, a second syntax tree is generated from the directed graph. In an embodiment, graph-to-syntax tree converter 410 of FIG. 4 is configured to receive and convert sorted dependency graph 420 to a second syntax tree 422. Accordingly, graph-to-syntax tree converter 410 performs the opposite operation to dependency graph generator 406. As described above, a syntax tree is a tree representation of the abstract syntactic structure of source program code, and thus may be easily converted to program code. Graph-to-syntax tree converter 410 generates second syntax tree 422 to include nodes, with each node representing a construct in the program code, such as a code statement, condition, variable, etc. The nodes are connected into a tree by branches which indicate the interrelationships between the nodes.

Accordingly, second syntax tree 422 generated by graph-to-syntax tree converter 410 is a restructuring of sorted dependency graph 420, where the code statement nodes of sorted dependency graph 420 are each converted to one or more code constructs that are each assigned a node, and each node interconnected by branches with other code construct nodes.

In step 312, the second syntax tree is converted into refactored program code. In embodiment, c receives second syntax tree 422, and is configured to generate refactored program code 424 based thereon. Accordingly, syntax tree-to-code converter 412 performs the opposite operation to code-to-syntax tree converter 404. In an embodiment, refactored program code 424 is program code that is logically equivalent to program code 106, but is configured to operate more efficiently with respect to asynchronous code operations.

In particular, refactored program code 424 is an example of refactored program code 108 described above (FIG. 1), containing one or more refactored asynchronous code statements 112 that are replaced/reordered versions of asynchronous codes statements 110 of program code 106. Refactored program code 424 is program code that is logically equivalent (performs the same function(s)) as original program code 106, but is rewritten with refactored asynchronous code statements 112. Refactored asynchronous code statements 112 are configured to perform more efficiently than original asynchronous code statements 110, such as by including await statements repositioned to execute in as delayed a manner as possible, and extracting await statements from loops to reduce a number of awaits that are performed.

Note that step 312 is not performed in all embodiments. In some embodiments, user interface 212 of FIG. 1 (or other user interface) may enable the developer to select whether to permanently incorporate refactored asynchronous code statements 112 into the program code, or refactored asynchronous code statements 112 may be automatically refactored into the program code. Furthermore, in an embodiment, sorted dependency graph 420 may be converted directly to refactored program code 424 without generating intermediate second syntax tree 422.

With respect to the first illustrative example program code described above, asynchronous code optimizer 104 may generate the following refactored program code:

```
public class MyProgram
{
    public async Task SendAllEmails( )
    {
        var emailSender = new EmailSender( );
        var recipients = new List<EmailAddress>( )
        {
            new EmailAddress("User1@microsoft.com"),
            new EmailAddress("User2@microsoft.com")|
        };
        var emailContent1 = new MailContent("first mail :)");
        var mail1 = emailSender.SendEmail(recipients, emailContent1);
        var emailContent2 = new MailContent("second mail :)");
        var mail2 = emailSender.SendEmail(recipients, emailContent2);
        await mail1;
        await mail2;
    }
}
```

In this example, as described above with respect to step 302, await relaxer 502 generated task and await code statements to replace both of the original await code statements. Steps 304 and 306 converted the program code to a dependency graph. Additionally, in step 306, weights were assigned to the nodes of the dependency graph, including weights of 0 applied to the task statements ("var mail1" and "var mail2") and weights of 2 applied to the await statements ("await mail1" and "await mail2"). In step 308, topological sorter 408 sorted the dependency graph, and steps 310 and 312 converted the sorted dependency graph to refactored program code. Due to the sorting of step 308, the two await statements, "await mail1" and "await mail2" were relocated to the program code end, delaying their execution as much as possible to avoid unnecessary awaiting.

With respect to the second illustrative example program code described above, asynchronous code optimizer 104 may generate the following refactored program code:

```
public class EmailSender
{
    private IEmailClient m_client;
    public async Task SendEmail(
        |IEnumerable<EmailAddress> recipients, MailContent content)
    {
        var tasks = new List<Task>( );
        foreach (var recipient in recipients)
        {
            tasks.Add(m_client.SendEmail(recipient, content));
        }
        await Task.WhenAll(tasks);
    }
}
```

In this example, as described above with respect to step 302, await relaxer 502 generated a task and await code statement to replace the original await code statement. Furthermore, according to step 802 (FIG. 8), loop-relaxer 504 extracted the await code statement from the loop, and configured the await as an "WhenAll(tasks)" so that the await is performed on all of the tasks generated based on the task code statement within the loop. Note that as described above, loop-relaxer 504 may perform its functions (e.g., step 802) during step 302 (await-relaxing the program code), during step 306 (dependency graph generating), or elsewhere. Steps 304 and 306 converted the program code to a dependency graph. Additionally, in step 306, weights were assigned to the nodes of the dependency graph, including a weight of 0 applied to the task statement ("var tasks") and a weight of 2 applied to the await statement ("await Task.WhenAll (tasks);"). In step 308, topological sorter 408 sorted the dependency graph, and steps 310 and 312 converted the sorted dependency graph to refactored program code. Due to the extracting of the await from the loop, the await statement was relocated to the program code end and combined multiple task awaits into a single await ("WhenAll(tasks)"), delaying its execution as much as possible to avoid unnecessary awaiting.

Figure 12:
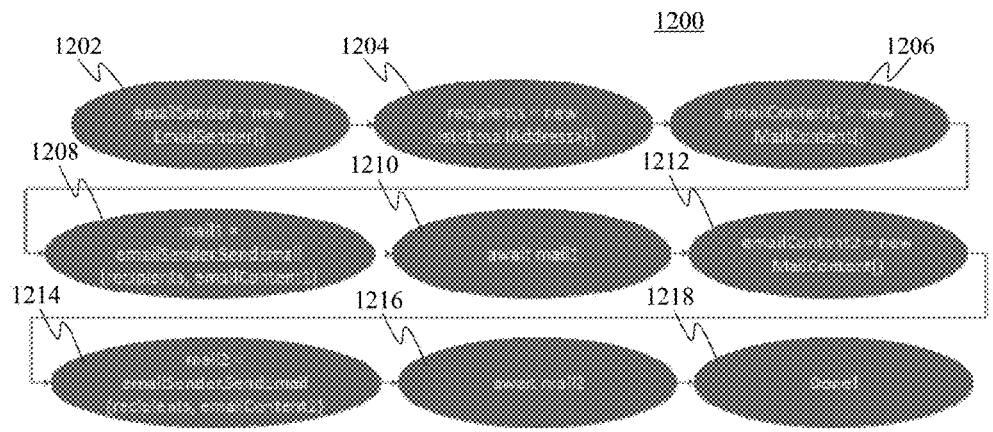
FIGS. 12-14 show diagrams of program code undergoing asynchronous code optimization with await-relaxing, according to an example embodiment.
Figure 13:
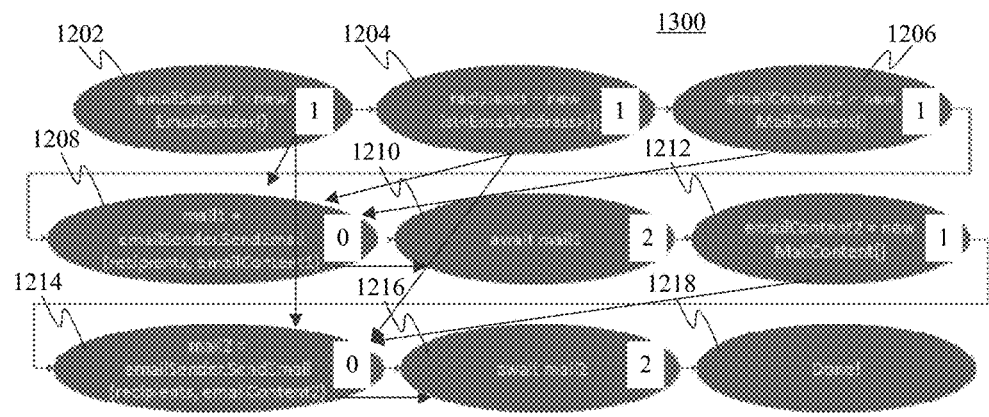
Figure 14:
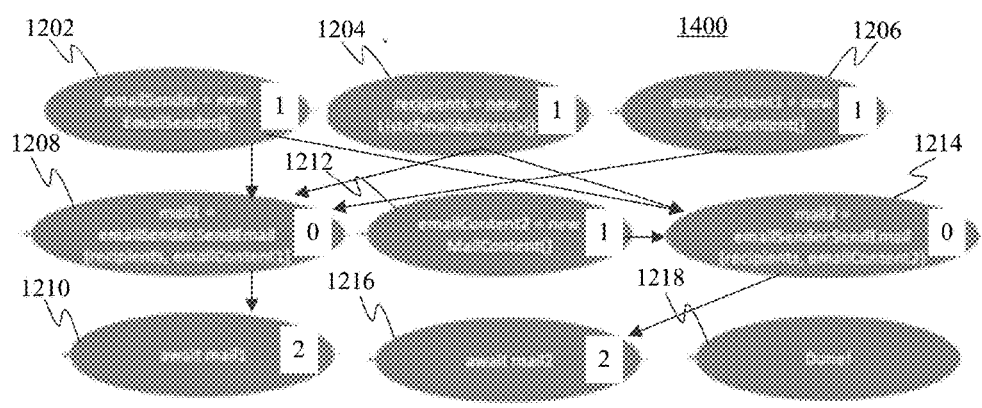
Figure 15:
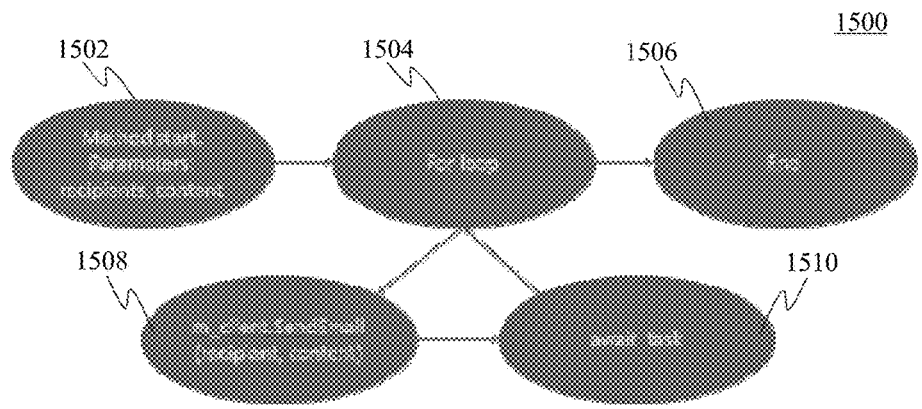
FIGS. 15-17 show diagrams of program code undergoing asynchronous code optimization with loop-relaxing, according to an example embodiment.
Figure 16:
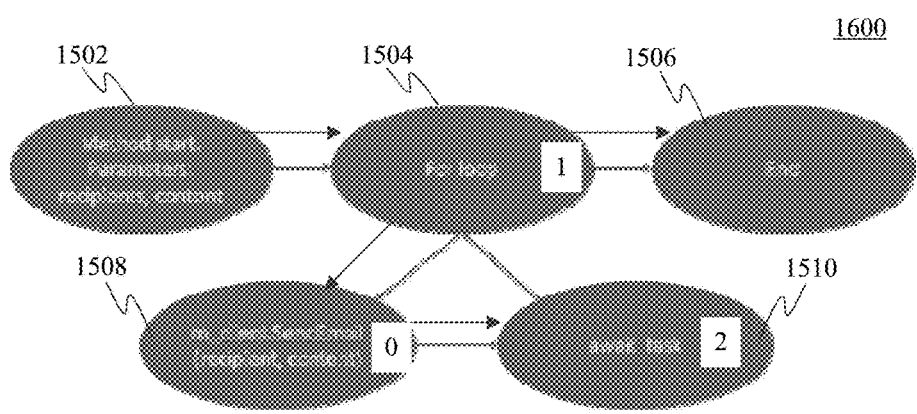
Figure 17:
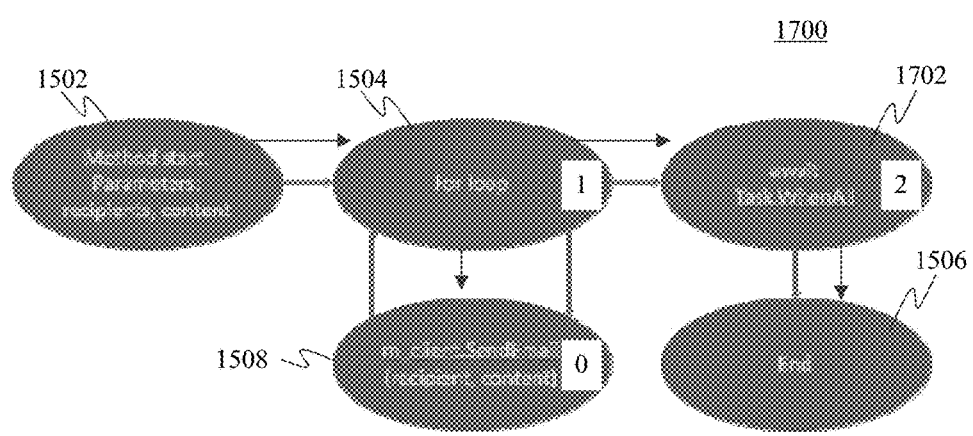

The optimizations of the first and second illustrative examples of program code described above are summarized and re-detailed with respect to FIGS. 12-17. FIGS. 12-14 show diagrams of the first example program code undergoing asynchronous code optimization with await-relaxing, according to an embodiment. FIGS. 15-17 show diagrams of the second example program code undergoing asynchronous code optimization with await-relaxing and loop-relaxing, according to an embodiment. FIGS. 12-14 and 15-17 are described as follows with reference to FIGS. 3 and 4.

With respect to the first example program code, FIG. 12 shows program code 1200 in the form of a sequence of nine code statement nodes 1202-1218 that has been await-relaxed by await-relaxer 502 according to step 302, as described above. As shown in FIG. 12, task code statement nodes 1208 and 1214 and await code statements 1210 and 1216 replace both of the original await code statements (shown herein further above). FIG. 12 illustrates program code 1200 with each code statement shown as a node.

FIG. 13 shows program code 1200 of FIG. 12 converted to a dependency graph 1300 according to steps 304 and 306. In steps 304 and 306, code-to-syntax tree converter 404 converted relaxed program code 1200 to first syntax tree 416, and dependency graph generator 406 generated dependency graph 1300 based on first syntax tree 416. In particular, in step 306, variable follower 902 followed variables of code statements 1202-1218 to generate the structure of dependency graph 1300 (step 1002 of FIG. 10), and weight assigner 904 assigned weight to the nodes of dependency graph 1300 (step 1004 of FIG. 10). Directed arrows are shown between code statement nodes 1202-1218, and numerical weights are shown associated with each of code statement nodes 1202-1218. In this example, weights in the range of 0-2 are assigned.

FIG. 14 shows a sorted dependency graph 1400, which is a version of dependency graph 1300 of FIG. 13 sorted according to step 308 by topological sorter 408. As shown in FIG. 13, sorted dependency graph 1400 is sorted into a weighted linear ordering of nodes such that for every directed edge from a first node to a second node, the first node comes before the second node in the ordering. Due to the sorting of step 308, the two await statements, "await mail1" and "await mail2" (nodes 1210 and 1216) were positioned at the program code end, delaying their execution as much as possible to avoid unnecessary awaiting.

Although not illustrated in FIGS. 12-14, in step 310, graph-to-syntax tree converter 410 converts sorted dependency graph 1400 to second syntax tree 422, and in step 312, syntax tree-to-code converter 412 converts second syntax tree 422 to refactored program code 424.

With respect to the second example program code, FIG. 15 shows program code 1500 in the form of a sequence of five code statement nodes 1502-1510 that has been await-relaxed by await-relaxer 502 according to step 302, as described above. As shown in FIG. 15, task code statement node 1508 and await code statement 1510 replace the original await code statement (shown herein further above). FIG. 15 illustrates program code 1500 with each code statement shown as a node.

FIG. 16 shows program code 1500 of FIG. 15 converted to a dependency graph 1600 according to steps 304 and 306. In steps 304 and 306, code-to-syntax tree converter 404 converted relaxed program code 1500 to first syntax tree 416, and dependency graph generator 406 generated dependency graph 1600 based on first syntax tree 416. In particular, in step 306, variable follower 902 followed variables of code statements 1502-1510 to generate the structure of dependency graph 1600 (step 1002 of FIG. 10), and weight assigner 904 assigned weight to the nodes of dependency graph 1600 (step 1004 of FIG. 10). Directed arrows are shown between code statement nodes 1502-1510, and numerical weights are shown associated with each of code statement nodes 1502-1510. In this example, weights in the range of 0-2 are assigned.

At this point or other, loop relaxer 504 may operate on code statement nodes 1502-1510 to loop-relax the code loop present there, as determined by loop relaxer 504 by the "foreach" statement (represented by node 1504), and by detecting the await keyword within the loop (represented by node 1510). In this example (as shown in code above), loop-relaxer 504 extracts the loop to a method by creating a task collection "tasks" outside the loop, by modifying the task code statement inside the loop with the "Add" keyword so that the tasks occurring within the loop are added to the collection, by pulling the await on task ("await task;") outside the loop, and converting the await with the "Task.WhenAll" keyword to an await on all of the tasks of the collection, only completing when all tasks have completed.

FIG. 17 shows a sorted dependency graph 1700, which is a version of dependency graph 1600 of FIG. 16 sorted according to step 308 by topological sorter 408. As shown by comparing FIGS. 16 and 17, code statement node 1510 "await task" is replaced by code statement node 1702, which is an "await Task.WhenAll" operation, and sorted dependency graph 1700 is sorted into a weighted linear ordering of nodes such that for every directed edge from a first node to a second node, the first node comes before the second node in the ordering. Due to the sorting of step 308, the await statement "await Task.WhenAll" of node 1702 is relocated to the program code end, outside of the loop, delaying its execution as much as possible and avoiding the await being repeated each loop cycle.

Although not illustrated in FIGS. 15-17, in step 310, graph-to-syntax tree converter 410 converts sorted dependency graph 1700 to second syntax tree 422, and syntax tree-to-code converter 412 converted second syntax tree 422 to refactored program code 424.

III. Example Mobile and Stationary Device Embodiments

Computing device 102, asynchronous code optimizer 104, compiler 204, development application 200, source code editor 202, compiler 204, debugger tool 206, code relaxer 402, code-to-syntax tree converter 404, dependency graph generator 406, topological sorter 408, graph-to-syntax tree converter 410, syntax tree-to-code converter 412, await-relaxer 502, loop-relaxer 504, variable follower 902, weight assigner 904, flowchart 300, step 602, step 702, step 802, flowchart 1000, and flowchart 1100 may be implemented in hardware, or hardware combined with software and/or firmware. For example, asynchronous code optimizer 104, compiler 204, development application 200, source code editor 202, compiler 204, debugger tool 206, code relaxer 402, code-to-syntax tree converter 404, dependency graph generator 406, topological sorter 408, graph-to-syntax tree converter 410, syntax tree-to-code converter 412, await-relaxer 502, loop-relaxer 504, variable follower 902, weight assigner 904, flowchart 300, step 602, step 702, step 802, flowchart 1000, and/or flowchart 1100 may be implemented as computer program code/instructions configured to be executed in one or more processors and stored in a computer readable storage medium. Alternatively, computing device 102, asynchronous code optimizer 104, compiler 204, development application 200, source code editor 202, compiler 204, debugger tool 206, code relaxer 402, code-to-syntax tree converter 404, dependency graph generator 406, topological sorter 408, graph-to-syntax tree converter 410, syntax tree-to-code converter 412, await-relaxer 502, loop-relaxer 504, variable follower 902, weight assigner 904, flowchart 300, step 602, step 702, step 802, flowchart 1000, and/or flowchart 1100 may be implemented as hardware logic/electrical circuitry.

For instance, in an embodiment, one or more, in any combination, of asynchronous code optimizer 104, compiler 204, development application 200, source code editor 202, compiler 204, debugger tool 206, code relaxer 402, code-to-syntax tree converter 404, dependency graph generator 406, topological sorter 408, graph-to-syntax tree converter 410, syntax tree-to-code converter 412, await-relaxer 502, loop-relaxer 504, variable follower 902, weight assigner 904, flowchart 300, step 602, step 702, step 802, flowchart 1000, and/or flowchart 1100 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 18:
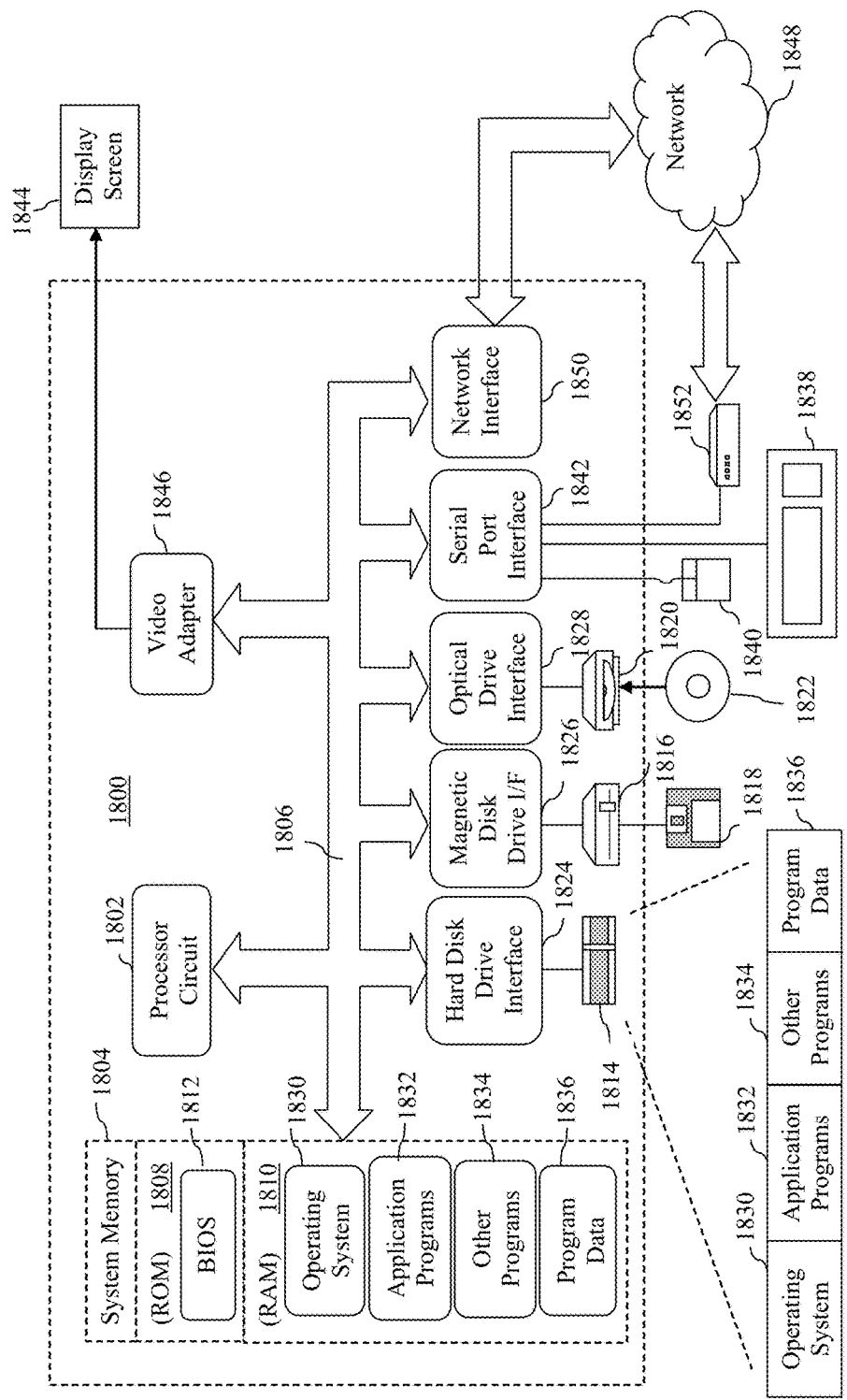
FIG. 18 shows a block diagram of an example computing device that may be used to implement embodiments.

FIG. 18 depicts an exemplary implementation of a computing device 1800 in which embodiments may be implemented. For example, computing device 102 and/or client computing device 104 may be implemented in one or more computing devices similar to computing device 1800 in stationary or mobile computer embodiments, including one or more features of computing device 1800 and/or alternative features. The description of computing device 1800 provided herein is provided for purposes of illustration, and is not intended to be limiting. Embodiments may be implemented in further types of computer systems, as would be known to persons skilled in the relevant art(s).

As shown in FIG. 18, computing device 1800 includes one or more processors, referred to as processor circuit 1802, a system memory 1804, and a bus 1806 that couples various system components including system memory 1804 to processor circuit 1802. Processor circuit 1802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1802 may execute program code stored in a computer readable medium, such as program code of operating system 1830, application programs 1832, other programs 1834, etc. Bus 1806 represents one or more of any of several types of bus structures, including a memory bus or memory controller, a peripheral bus, an accelerated graphics port, and a processor or local bus using any of a variety of bus architectures. System memory 1804 includes read only memory (ROM) 1808 and random access memory (RAM) 1810. A basic input/output system 1812 (BIOS) is stored in ROM 1808.

Computing device 1800 also has one or more of the following drives: a hard disk drive 1814 for reading from and writing to a hard disk, a magnetic disk drive 1816 for reading from or writing to a removable magnetic disk 1818, and an optical disk drive 1820 for reading from or writing to a removable optical disk 1822 such as a CD ROM, DVD ROM, or other optical media. Hard disk drive 1814, magnetic disk drive 1816, and optical disk drive 1820 are connected to bus 1806 by a hard disk drive interface 1824, a magnetic disk drive interface 1826, and an optical drive interface 1828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1830, one or more application programs 1832, other programs 1834, and program data 1836. Application programs 1832 or other programs 1834 may include, for example, computer program logic (e.g., computer program code or instructions) for implementing asynchronous code optimizer 104, compiler 204, development application 200, source code editor 202, compiler 204, debugger tool 206, code relaxer 402, code-to-syntax tree converter 404, dependency graph generator 406, topological sorter 408, graph-to-syntax tree converter 410, syntax tree-to-code converter 412, await-relaxer 502, loop-relaxer 504, variable follower 902, weight assigner 904, flowchart 300, step 602, step 702, step 802, flowchart 1000, and/or flowchart 1100 (including any suitable step of flowcharts 300, 1000, 1100), and/or further embodiments described herein.

A user may enter commands and information into the computing device 1800 through input devices such as keyboard 1838 and pointing device 1840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1802 through a serial port interface 1842 that is coupled to bus 1806, but may be connected by other interfaces, such as a parallel port, game port, or a universal serial bus (USB).

A display screen 1844 is also connected to bus 1806 via an interface, such as a video adapter 1846. Display screen 1844 may be external to, or incorporated in computing device 1800. Display screen 1844 may display information, as well as being a user interface for receiving user commands and/or other information (e.g., by touch, finger gestures, virtual keyboard, etc.). In addition to display screen 1844, computing device 1800 may include other peripheral output devices (not shown) such as speakers and printers.

Computing device 1800 is connected to a network 1848 (e.g., the Internet) through an adaptor or network interface 1850, a modem 1852, or other means for establishing communications over the network. Modem 1852, which may be internal or external, may be connected to bus 1806 via serial port interface 1842, as shown in FIG. 18, or may be connected to bus 1806 using another interface type, including a parallel interface.

As used herein, the terms "computer program medium," "computer-readable medium," and "computer-readable storage medium" are used to refer to physical hardware media such as the hard disk associated with hard disk drive 1814, removable magnetic disk 1818, removable optical disk 1822, other physical hardware media such as RAMs, ROMs, flash memory cards, digital video disks, zip disks, MEMs, nanotechnology-based storage devices, and further types of physical/tangible hardware storage media (including memory 1820 of FIG. 18). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1832 and other programs 1834) may be stored on the hard disk, magnetic disk, optical disk, ROM, RAM, or other hardware storage medium. Such computer programs may also be received via network interface 1850, serial port interface 1842, or any other interface type. Such computer programs, when executed or loaded by an application, enable computing device 1800 to implement features of embodiments discussed herein. Accordingly, such computer programs represent controllers of the computing device 1800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Example Embodiments

In an embodiment, a method for transforming asynchronous code into more efficient, logically equivalent asynchronous code comprises: converting program code into a first syntax tree; generating a dependency graph from the first syntax tree with each node of the dependency graph corresponding to a code statement and having an assigned weight; performing weighted topological sorting of the dependency graph to generate a sorted dependency graph; and generating a second syntax tree from the sorted dependency graph.

In an embodiment, the converting program code into a first syntax tree comprises: transforming the program code into await-relaxed program code; and converting the await-relaxed program code into the first syntax tree.

In an embodiment, the transforming the program code into await-relaxed program code comprises: converting any awaits on asynchronous method calls in the program code to awaits on task variables.

In an embodiment, the converting program code into a first syntax tree comprises: transforming the program code into loop-relaxed program code; and converting the loop-relaxed program code into the first syntax tree.

In an embodiment, the generating a dependency graph from the first syntax tree with each node of the dependency graph corresponding to a code statement and having an assigned weight comprises: generating a dependency graph by following on variables resulting from each code statement of the first syntax tree; and assigning weights to the nodes of the dependency graph.

In an embodiment, the assigning weights to the nodes of the dependency graph comprises: assigning a first weight to nodes of the dependency graph corresponding to code statements that start asynchronous operations; assigning a second weight to nodes of the dependency graph corresponding to code statements that await; and assigning a third weight to nodes of the dependency graph not assigned the first weight and not assigned the second weight.

In an embodiment, the method further comprises: converting the second syntax tree into refactored program code.

In another embodiment, a computing device comprises: at least one processor circuit; and at least one memory that stores instructions configured to be executed by the at least one processor circuit, the instructions configured to perform operations for transforming asynchronous code into more efficient, logically equivalent asynchronous code, the operations comprising: converting program code into a first syntax tree, generating a dependency graph from the first syntax tree with each node of the dependency graph corresponding to a code statement and having an assigned weight, performing weighted topological sorting of the dependency graph to generate a sorted dependency graph, and generating a second syntax tree from the sorted dependency graph.

In an embodiment, the converting program code into a first syntax tree comprises: transforming the program code into await-relaxed program code; and converting the await-relaxed program code into the first syntax tree.

In an embodiment, the transforming the program code into await-relaxed program code comprises: converting any awaits on asynchronous method calls in the program code to awaits on task variables.

In an embodiment, the converting program code into a first syntax tree comprises: transforming the program code into loop-relaxed program code; and converting the loop-relaxed program code into the first syntax tree.

In an embodiment, the generating a dependency graph from the first syntax tree with each node of the dependency graph corresponding to a code statement and having an assigned weight comprises: generating a dependency graph by following on variables resulting from each code statement of the first syntax tree; and assigning weights to the nodes of the dependency graph.

In an embodiment, the assigning weights to the nodes of the dependency graph comprises: assigning a first weight to nodes of the dependency graph corresponding to code statements that start asynchronous operations; assigning a second weight to nodes of the dependency graph corresponding to code statements that await; and assigning a third weight to nodes of the dependency graph not assigned the first weight and not assigned the second weight.

In an embodiment, where the instructions are further configured to perform operations comprising: converting the second syntax tree into refactored program code.

In another embodiment, a computing device comprises: at least one processor circuit; and at least one memory that stores instructions configured to be executed by the at least one processor circuit, the instructions configured to perform operations for transforming asynchronous code into more efficient, logically equivalent asynchronous code, the instructions comprising: a code-to-syntax tree converter configured to convert program code into a first syntax tree; a dependency graph generator configured to generate a dependency graph from the first syntax tree with each node of the dependency graph corresponding to a code statement and having an assigned weight; a topological sorter configured to perform weighted topological sorting of the dependency graph to generate a sorted dependency graph; a graph-to-syntax tree converter configured to generate a second syntax tree from the sorted dependency graph; and a syntax tree-to-code converter configured to convert the second syntax tree into refactored program code.

In an embodiment, wherein the instructions further comprise: an await relaxer configured transform the program code into await-relaxed program code; and the code-to-syntax tree converter is configured to convert the await-relaxed program code into the first syntax tree.

In an embodiment, the await-relaxer is configured to convert any awaits on asynchronous method calls in the program code to awaits on task variables.

In an embodiment, wherein the instructions further comprise: a loop-relaxer configured to transform the program code into loop-relaxed program code; and the code-to-syntax tree converter is configured to convert the loop-relaxed program code into the first syntax tree In an embodiment, the dependency graph generator includes: a variable follower configured to generate the dependency graph by following on variables resulting from each code statement of the first syntax tree; and a weight assigner configured to assign weights to the nodes of the dependency graph.

In an embodiment, the weight assigner is configured to: assign a first weight to nodes of the dependency graph corresponding to code statements that start asynchronous operations; assign a second weight to nodes of the dependency graph corresponding to code statements that await; and assign a third weight to nodes of the dependency graph not assigned the first weight and not assigned the second weight.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for transforming asynchronous code into more efficient, logically equivalent asynchronous code, comprising:
converting asynchronous program code into a first syntax tree;
generating a dependency graph from the first syntax tree with each node of the dependency graph corresponding to a code statement and having an assigned weight;
performing weighted topological sorting of the dependency graph to generate a sorted dependency graph, said performing weighted topological sorting including modifying an order of asynchronous code statements in the dependency graph based at least on weights assigned to nodes of the dependency graph; and
converting the sorted dependency graph to refactored asynchronous code that is logically equivalent to the asynchronous program code.

2. The method of claim 1, wherein said converting asynchronous program code into a first syntax tree comprises:
transforming the asynchronous program code into await-relaxed program code; and
converting the await-relaxed program code into the first syntax tree.

3. The method of claim 2, wherein said the transforming the asynchronous program code into await-relaxed program code comprises:
converting any awaits on asynchronous method calls in the asynchronous program code to awaits on task variables.

4. The method of claim 1, wherein said converting asynchronous program code into a first syntax tree comprises:
transforming the asynchronous program code into loop-relaxed program code; and
converting the loop-relaxed program code into the first syntax tree.

5. The method of claim 1, wherein said generating a dependency graph from the first syntax tree with each node of the dependency graph corresponding to a code statement and having an assigned weight comprises:
generating a dependency graph by following on variables resulting from each code statement of the first syntax tree; and
assigning weights to the nodes of the dependency graph.

6. The method of claim 5, wherein said assigning weights to the nodes of the dependency graph comprises:
assigning a first weight to nodes of the dependency graph corresponding to code statements that start asynchronous operations;
assigning a second weight to nodes of the dependency graph corresponding to code statements that await; and
assigning a third weight to nodes of the dependency graph not assigned the first weight and not assigned the second weight.

7. The method of claim 1, wherein said converting the sorted dependency graph to refactored asynchronous code that is logically equivalent to the asynchronous program code comprises:
generating a second syntax tree from the sorted dependency graph; and
converting the second syntax tree into the refactored asynchronous code.

8. A computing device, comprising:
at least one processor circuit; and
at least one memory that stores instructions configured to be executed by the at least one processor circuit, the instructions configured to perform operations for transforming asynchronous code into more efficient, logically equivalent asynchronous code, the operations comprising:
converting asynchronous program code into a first syntax tree,
generating a dependency graph from the first syntax tree with each node of the dependency graph corresponding to a code statement and having an assigned weight, performing weighted topological sorting of the dependency graph to generate a sorted dependency graph, said performing weighted topological sorting including
modifying an order of asynchronous code statements in the dependency graph based at least on weights assigned to nodes of the dependency graph; and
converting the sorted dependency graph to refactored asynchronous code that is logically equivalent to the asynchronous program code.

9. The computing device of claim 8, wherein said converting asynchronous program code into a first syntax tree comprises:
transforming the asynchronous program code into await-relaxed program code; and
converting the await-relaxed program code into the first syntax tree.

10. The computing device of claim 9, wherein said the transforming the asynchronous program code into await-relaxed program code comprises:
converting any awaits on asynchronous method calls in the asynchronous program code to awaits on task variables.

11. The computing device of claim 8, wherein said converting asynchronous program code into a first syntax tree comprises:
transforming the asynchronous program code into loop-relaxed program code; and
converting the loop-relaxed program code into the first syntax tree.

12. The computing device of claim 8, wherein said generating a dependency graph from the first syntax tree with each node of the dependency graph corresponding to a code statement and having an assigned weight comprises:
generating a dependency graph by following on variables resulting from each code statement of the first syntax tree; and
assigning weights to the nodes of the dependency graph.

13. The computing device of claim 12, wherein said assigning weights to the nodes of the dependency graph comprises:
assigning a first weight to nodes of the dependency graph corresponding to code statements that start asynchronous operations;
assigning a second weight to nodes of the dependency graph corresponding to code statements that await; and
assigning a third weight to nodes of the dependency graph not assigned the first weight and not assigned the second weight.

14. The computing device of claim 8, where said converting the sorted dependency graph to refactored asynchronous code that is logically equivalent to the asynchronous program code comprises:
generating a second syntax tree from the sorted dependency graph; and
converting the second syntax tree into the refactored asynchronous code.

15. A computing device, comprising:
at least one processor circuit; and
at least one memory that stores instructions configured to be executed by the at least one processor circuit, the instructions configured to perform operations for transforming asynchronous code into more efficient, logically equivalent asynchronous code, the instructions comprising:
a code-to-syntax tree converter configured to convert asynchronous program code into a first syntax tree;
a dependency graph generator configured to generate a dependency graph from the first syntax tree with each node of the dependency graph corresponding to a code statement and having an assigned weight;
a topological sorter configured to perform weighted topological sorting of the dependency graph to generate a sorted dependency graph, wherein to perform weighted topological sorting, the topological sorter is configured to modify an order of asynchronous code statements in the dependency graph based at least on weights assigned to nodes of the dependency graph; and
a graph-to-code converter configured to convert the sorted dependency graph to refactored asynchronous code that is logically equivalent to the asynchronous program code.

16. The computing device of claim 15, wherein the code-to-syntax tree converter includes:
an await relaxer configured transform the asynchronous program code into await-relaxed program code; and
the code-to-syntax tree converter is configured to convert the await-relaxed program code into the first syntax tree.

17. The computing device of claim 16, wherein the await-relaxer is configured to convert any awaits on asynchronous method calls in the asynchronous program code to awaits on task variables.

18. The computing device of claim 15, wherein the code-to-syntax tree converter includes:
a loop-relaxer configured to transform the asynchronous program code into loop-relaxed program code; and
the code-to-syntax tree converter is configured to convert the loop-relaxed program code into the first syntax tree.

19. The computing device of claim 15, wherein the dependency graph generator includes:
a variable follower configured to generate the dependency graph by following on variables resulting from each code statement of the first syntax tree; and
a weight assigner configured to assign weights to the nodes of the dependency graph.

20. The computing device of claim 19, the weight assigner is configured to:
assign a first weight to nodes of the dependency graph corresponding to code statements that start asynchronous operations;
assign a second weight to nodes of the dependency graph corresponding to code statements that await; and
assign a third weight to nodes of the dependency graph not assigned the first weight and not assigned the second weight.

* * * * *